UNITED STATES PATENT OFFICE.

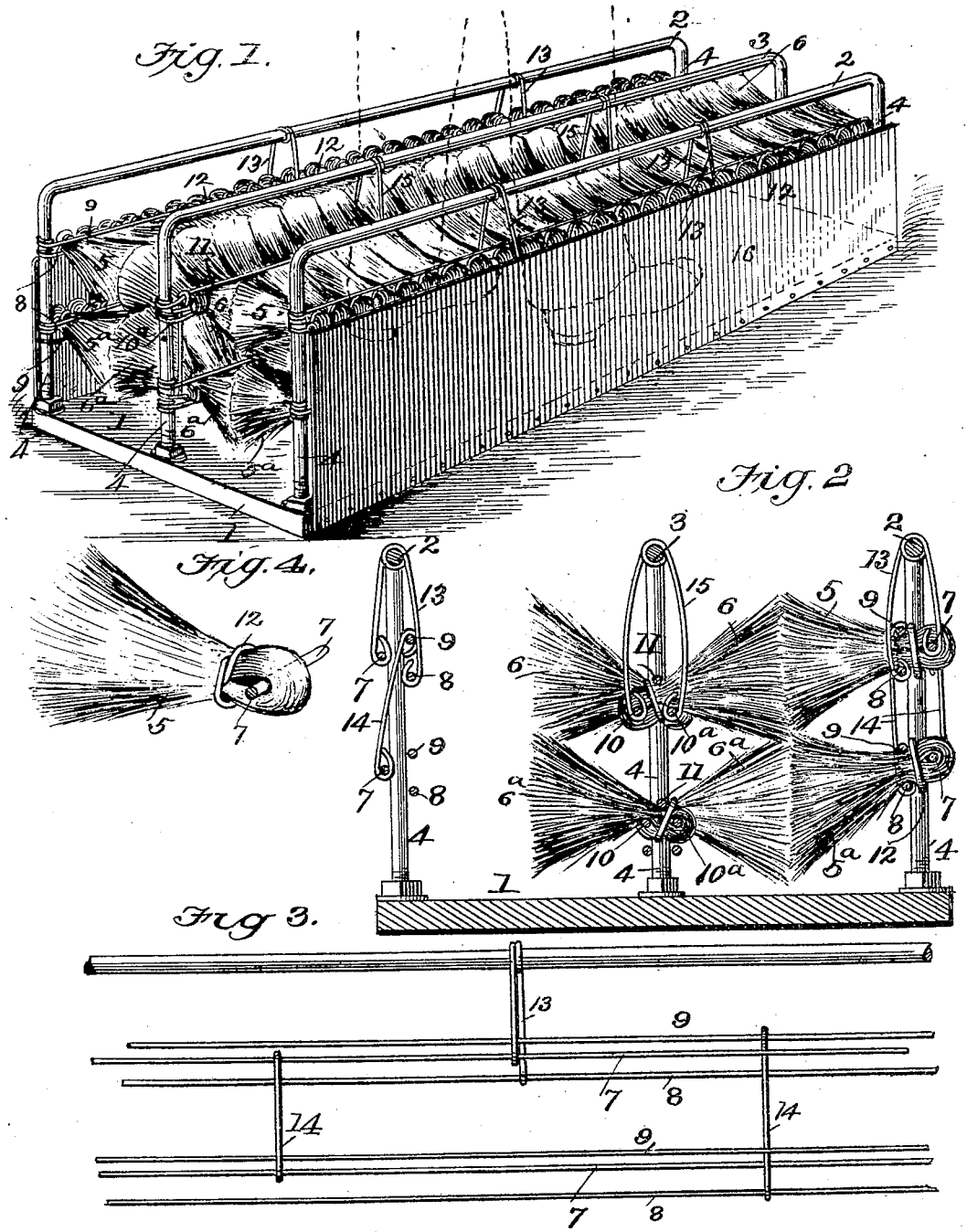

MARCELLUS M. HITT, OF LURAY, VIRGINIA.

SHOE AND PANTS DUSTER.

No. 800,578.      Specification of Letters Patent.      Patented Sept. 26, 1905.

Application filed November 11, 1904. Serial No. 232,286.

*To all whom it may concern:*

Be it known that I, MARCELLUS M. HITT, a citizen of the United States, and a resident of Luray, in the county of Page and State of Virginia, have invented a new and Improved Shoe and Pants Duster, of which the following is a specification.

My invention is an apparatus adapted for removing dust and dirt from boots and shoes and the lower portions of pants-legs without the use of a hand-brush or other manually-operated device. I arrange the brushes horizontally and opposite each other and support them upon a suitable frame, their free ends being in contact, or nearly so, and thus adapted for contact with shoes and the lower portions of pants-legs when a person walks or otherwise passes his feet between the brushes.

The details of construction, arrangement, and combination of parts is as hereinafter described, reference being had to the accompanying drawings, in which—

Figure 1 is a perspective view of my improved apparatus. Fig. 2 is a vertical transverse section, the brushes being omitted on one of the outer supports. Fig. 3 is a side view of a portion of one of the skeleton frames of the apparatus which support brushes. Fig. 4 is a perspective view of one of the brushes proper, together with a portion of one of the rods or wires to which it is attached.

As shown in Figs. 1 and 2, the frame of the apparatus comprises a horizontal base 1 and a series of parallel rigid supports 2 3, the same being composed of iron rods which are bent at a right angle at each end, thus forming legs 4, which are secured to the base 1. The said supports are arranged longitudinally parallel and spaced apart, the outer ones, 2 2, being at the side edges of the base 1 and the central one, 3, being equidistant between them. Brushes 5 $5^a$ and 6 $6^a$ are arranged in the two spaces between the outer supports 2 and the central one, 3. Thus there are two horizontal rows of brushes 5 and $5^a$, supported upon each of the frames 2, the same projecting inward or toward the central frame 3, while there are four rows of brushes 6 $6^a$, supported upon the central frame 3 and projecting laterally in opposite directions. The means of support for the outer brushes 5 $5^a$ are wires 7 8 9 and the means for supporting the inner brushes 6 $6^a$ are rods or wires 10, $10^a$, and 11. The wires 7 8 9 extend parallel between the legs 4 of the outer supports 2 and are firmly attached thereto, as indicated in Fig. 1, the same being wound around the legs 4 or otherwise secured, as may be preferred. The wires are parallel and are spaced apart in each group or set of three. The brushes 5 $5^a$ are attached to the outer wires 7 and extend inward between the other wires 8 and 9. The brushes may be formed of any suitable fibrous material, such as bristles, hemp, jute, rope fiber, &c. To form the brushes, the strands of the material of which they are composed are doubled at the middle around the wires 7 and passed between the wires 8 and 9. Between the wires 7 and the wires 8 and 9 the strands are clasped or clamped by a device 12, (see Fig. 4,) which may be a stout flexible wire. The same may be applied so as to clamp tightly around the neck of the brush by any suitable tool. It will be seen that while the brushes 5 $5^a$ are attached to the outer wires 7 they are supported upon the wires 8 and that the wires 9 prevent movement in an upward direction. Thus the several brushes are held firmly in place, while their free ends diverge or spread out and have great flexibility. The brushes 6 $6^a$, which are attached to the central support 3, are arranged and secured in nearly the same manner as the brushes 5 $5^a$—that is to say, those brushes which project to the right (see Figs. 1 and 2) are secured to the opposite wire 10, while the brushes which project to the left are secured to the opposite wire $10^a$, and they alternate in position, one projecting in one direction and the next in the opposite direction, as will be readily understood. The binding-wire 11 extends over the tops of all the brushes at a point above and equidistant from the wires 10 $10^a$. This wire 11 has practically the same function as the wires 9 before described.

As shown in Figs. 1 and 2, the free ends of the brushes 5 and 6 and $5^a$ and $6^a$ abut, and while this is preferred it is not absolutely necessary, for practically the same effect may be obtained if the end of the brushes approximate closely.

In using the apparatus it is placed horizontally, as shown, and a person who desires to use it for dusting his boots or shoes and the lower portions of his trousers places his feet on the base 1 in the spaces between the outer and inner legs 4 and slides his feet along the base, his legs then passing between the two sets of brushes 5 6 and $5^a$ $6^a$ in the respective passage-ways provided. In other words, the resiliency of the brushes allows them to yield as the feet of the person advance, and since the brushes work in contact with his shoes and the lower portions of his trousers-legs the same are dusted very completely. It is thus practicable to effect the dusting operation with great despatch and without any manual labor.

The wires 7 8 9 and 10, $10^a$, and 11 are supported by hangers 13, 14, and 15, the same being formed of small wires twisted around the horizonal portions of the supports 2 2 3 and their pendent portions being looped or fastened around the longitudinal wires, as shown in Figs. 2 and 3.

Guide-plates 16 are arranged along the outer sides of the apparatus, as shown in Fig. 1. They form a firm appendage of the apparatus and serve to protect the outer brushes and also to prevent the escape of dust at the sides.

What I claim is—

1. In an apparatus for the purpose specified, the combination, with the horizontal base and vertical supports secured thereto, of wires arranged parallel to said base and stretched between the supports and spaced apart, and a series of brushes attached to one of said wires, their bodies being supported upon an adjacent wire, substantially as described.

2. In an apparatus for the purpose specified, the combination with a base and vertical supports, of a series of three wires arranged in triangular relation parallel to each other and to the base, and a series of brushes attached to one of said wires and extending between the other two wires whereby they are supported in horizontal position and held from vertical movement save at their free ends, substantially as described.

3. In an apparatus for the purpose specified, the combination with a base and vertical supports, of wires arranged parallel to the base and spaced apart, and a series of brushes formed of strands of resilient material looped around one of the wires and supported upon an adjacent wire, the necks of the brushes adjacent to the wire around which they are looped being tightly bound and their free ends projecting horizontally, substantially as described.

4. In an apparatus for the purpose specified, the combination with the base and vertical supports, of three wires arranged parallel and spaced apart in triangular relation, and two series of brushes one attached to one of the lower wires and the other series to the opposite lower wire, in alternate relation, the upper central wire extending over the necks of both series of brushes and thus securing them, substantially as described.

5. In an apparatus for the purpose specified, the combination with a horizontal base and vertical supporting-frames formed of rods which are bent at a right angle to form vertical legs, wires extending between and secured to the said legs, and brushes arranged in opposite series and attached to and supported by the opposite sets of wires, their free ends projecting toward each other to operate in the manner described.

6. The combination, with a horizontal base and rigid supports secured thereto and having horizontal portions, of brush-supporting wires attached to the vertical portions of the frames and extending parallel to the base, brushes attached to the said wires, and stays attached to the horizontal portions of the frames and extending downward and connected with the brush-supporting wires, substantially as described.

MARCELLUS M. HITT.

Witnesses:
CHAS. T. SANDRAM,
EMMET C. BERREY.